(12) United States Patent
Smith

(10) Patent No.: US 8,118,179 B2
(45) Date of Patent: Feb. 21, 2012

(54) ADJUSTABLE STORAGE RACK FOR COOKING UTENSILS

(76) Inventor: Carol Porter Smith, Saratoga, WY (US)

(*) Notice: Subject to any disclaimer, the term of this patent is extended or adjusted under 35 U.S.C. 154(b) by 338 days.

(21) Appl. No.: 12/482,434

(22) Filed: Jun. 10, 2009

(65) Prior Publication Data

US 2010/0072146 A1    Mar. 25, 2010

(51) Int. Cl.
A47G 19/08    (2006.01)
(52) U.S. Cl. .................................................. 211/41.5
(58) Field of Classification Search ............... 211/41.5, 211/41.3, 85.25, 41.4, 41.6; D32/3, 55; D6/407
See application file for complete search history.

(56) References Cited

U.S. PATENT DOCUMENTS

| | | | | |
|---|---|---|---|---|
| 2,479,118 | A | * | 8/1949 | Jenness .................. 211/41.5 |
| 2,516,088 | A | * | 7/1950 | Einhorn .................. 211/41.5 |
| 2,686,598 | A | * | 8/1954 | Brecht .................... 211/41.5 |
| 2,739,715 | A | * | 3/1956 | Planeta ................... 211/41.4 |
| 3,025,967 | A | * | 3/1962 | Christophersen ........ 211/41.5 |
| 3,169,641 | A | * | 2/1965 | Chapman ................. 211/74 |
| D231,178 | S | * | 4/1974 | Wright ................... D6/407 |
| 4,150,629 | A | | 4/1979 | Santi |
| 4,475,656 | A | * | 10/1984 | Collier ................... 211/41.8 |
| 4,592,471 | A | | 6/1986 | Bross |
| 4,726,475 | A | * | 2/1988 | Ferenzi .................. 211/41.5 |
| D297,489 | S | * | 9/1988 | Chap et al. ............. D7/601 |
| D353,922 | S | * | 12/1994 | Drake ................... D32/55 |
| D363,578 | S | * | 10/1995 | Brightbill et al. ........ D32/55 |
| 5,660,284 | A | | 8/1997 | Vaughn |
| 6,357,605 | B1 | * | 3/2002 | Martorella ............. 211/41.6 |
| 6,729,479 | B2 | | 5/2004 | Morgan |
| 6,769,751 | B1 | | 8/2004 | Harbison |
| 7,007,808 | B2 | | 3/2006 | Morgan |
| 7,104,409 | B2 | | 9/2006 | Morgan |
| D538,496 | S | * | 3/2007 | Plikuhn ................. D32/55 |
| D554,818 | S | * | 11/2007 | Murray .................. D32/55 |
| 7,458,470 | B2 | | 12/2008 | Jerstroem et al. |
| 2002/0144960 | A1 | * | 10/2002 | Adkins ................. 211/41.6 |
| 2003/0213759 | A1 | * | 11/2003 | Compagnucci ........ 211/41.11 |
| 2005/0236344 | A1 | * | 10/2005 | Yang et al. ............ 211/41.4 |
| 2007/0247039 | A1 | * | 10/2007 | Anderson et al. ...... 312/228.1 |
| 2008/0029465 | A1 | * | 2/2008 | Yang et al. ............ 211/41.5 |
| 2010/0072146 | A1 | * | 3/2010 | Smith ................... 211/41.2 |

OTHER PUBLICATIONS

Author Unknown, Advertisement—Rubbermaid Pan Organizer, Date—Unknown, Target Corp.

* cited by examiner

Primary Examiner — Sarah Purol
(74) Attorney, Agent, or Firm — Christopher J. Kulish

(57) ABSTRACT

The present invention is directed to a method for providing a storage rack for cooking utensils, such as skillets and the like, that can be adjusted to accommodate cooking utensils having different characteristics. Adjustment of the rack is accomplished by assessing a particular cooking utensil and bending one or more bendable members to define a slot between two of the bendable members that is of a width that potentially accommodates the cooking utensil. In another embodiment, a bendable handle support member is provided that is capable of being moved between two positions, one of which supports an extended handle of a cooking utensil in an elevated position and the other of which does not support the handle in an elevated position. In yet a further embodiment, a bendable positioner is provided that can be bent to engage a surface adjacent to a support surface and prevent the base from moving.

17 Claims, 7 Drawing Sheets

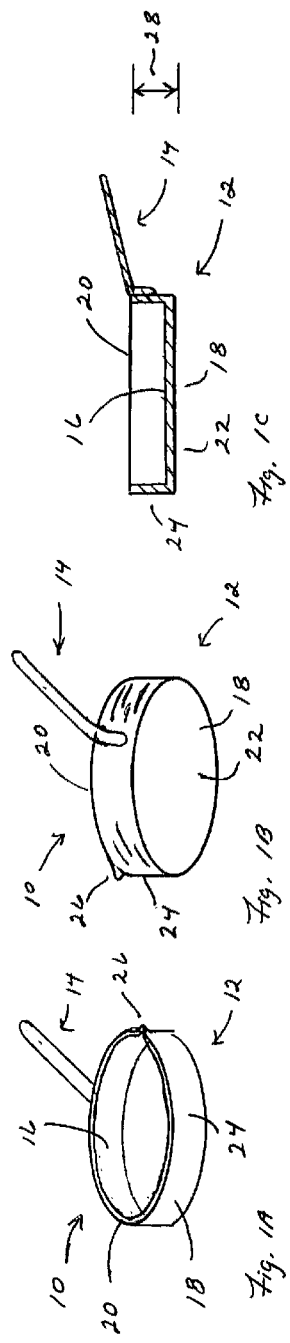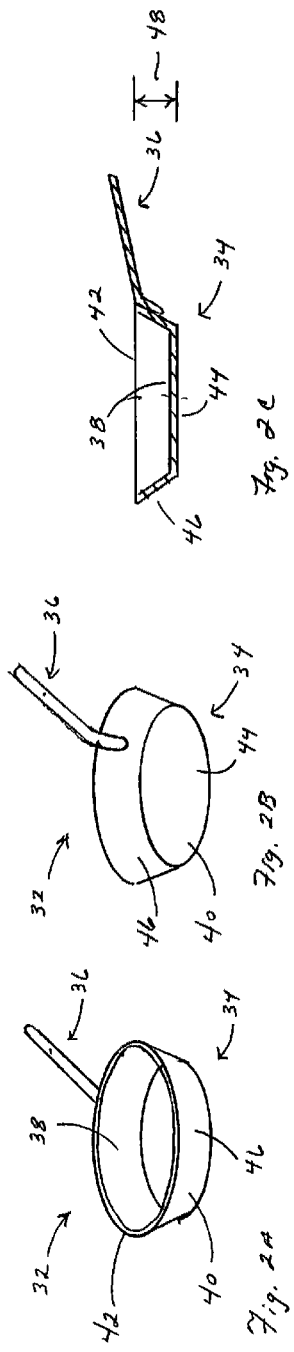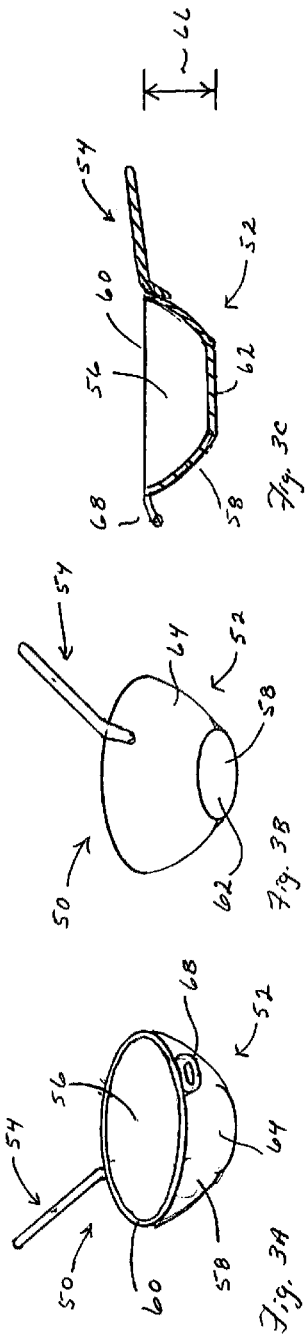

ADJUSTABLE STORAGE RACK FOR COOKING UTENSILS

FIELD OF THE INVENTION

The present invention relates to a storage rack and, more specifically, to an adjustable storage rack for accommodating cooking utensils.

BACKGROUND OF THE INVENTION

One class of cooking utensils includes a vessel for holding food that is to be cooked or otherwise prepared and an extended handle that is connected to the vessel and allows the cook to manipulate the vessel. In this class of cooking utensils are skillets, fry pans, woks, grill pans, chef's pans, sauciers, deep fryers and sauté pans to name a few. Many of the larger cooking utensils in this class that are capable or holding a significant amount of food and/or have a large diameter vessel have a second handle that is disposed opposite to the extended handle. The extended handle and the second handle facilitate the movement of the utensil from one place to another by the cook. Hereinafter the term cooking utensil or utensil is used to refer to cooking utensils of the noted class.

In many households, storage space in the kitchen is limited. Consequently, to save space, cooking utensils are stacked one on top of the other in a cabinet, in a drawer, or on a shelf. Typically, the utensils are stacked in a nested fashion with the utensil having the largest diameter vessel located at the bottom of the stack, the smallest diameter vessel located at the top of the stack, and utensils with intermediate diameters located between the utensils at the top and bottom of the stack. Stacking the utensils in this way can make the retrieval of a particular utensil awkward and cumbersome. To alleviate this problem, various types of storage racks for such cooking utensils have evolved. For example, there is a storage rack that is typically attached to a ceiling and has a plurality of hooks from which the cooking utensils can be hung. Typically, the hook is passed through a hole in the end of the extended handle or a loop of wire associated with the extended handle. There are also vertical storage racks that hold the utensils in a vertical stack but separated from one another so that the cook does not have "de-nest" the utensils from one another to retrieve the desired utensil. Additionally, there are storage racks that hold utensils in a horizontal "stack," similar to files in a file cabinet.

SUMMARY OF THE INVENTION

Cooking utensils of the noted class have a vessel with an exterior surface, an interior surface, and a substantially circular rim separating the exterior surface from the interior surface. The exterior surface includes a substantially flat and circular bottom surface and a side surface that extends between the bottom surface and the rim. The substantially circular rim may include a spout, as in a saucier.

One characteristic of a cooking utensil is its height. The height of a cooking utensil is the perpendicular distance between a plane that is defined by the bottom surface and a plane that is defined by the rim. There is a broad range in the height of cooking utensils. For instance, a grill pan can have a height 25 mm or less, while a stir fry pan can have a height of 75 mm or more.

Another characteristic of a cooking utensil is its side profile. When the rim has substantially the same diameter as the bottom surface, the side surface extends substantially perpendicular to the bottom surface, as in many sauté pans. Alternatively, when the rim has a larger diameter than the bottom surface, the side surface is not perpendicular to the bottom surface. In this case, the side surface can be angled relative to the bottom surface, i.e., in cross-section follows a line that is at an angle to the bottom surface that is greater than 90°. Alternatively, the side surface can follow a curve when viewed in cross-section. Exemplary of utensils with an angled or curved side surface are skillets. Side profiles with straight and curved sections when viewed in cross-section are also possible.

Yet another characteristic of a cooking utensil is the difference in the radius of the bottom surface and the rim. In the case of the bottom surface and the rim having substantially the same radius, there is little if any difference. When, however, the side surface is not perpendicular to the bottom surface, there is a difference in the radius of the bottom surface and the rim. A typical skillet has a difference in radius of about 25 mm. In contrast, a typical wok or stir fry pan can have a difference in radius of 100 mm.

One embodiment of the invention is directed to a method of adjusting a storage rack that accommodates cooking utensils in a horizontal stack. The method involves providing an adjustable storage rack and providing a cooking utensil that the storage rack is to be adjusted to accommodate. The storage rack includes a base for placing on a substantially horizontal surface, such as shelf, counter, or the bottom of a cabinet or drawer. Operatively attached to the base are a plurality of bendable members, i.e., members that are capable of being bent from one position to another position by the user's own strength, the user's strength supplemented with a typical household tool (e.g., a pair of pliers), or the user's own strength in conjunction with a simple tool that can be provided with the rack or otherwise readily obtained. The method further involves assessing at least one characteristic of the cooking utensil. Based on the assessment, at least one of plurality of bendable members is bent such that a pair of the plurality of bendable members define a slot with a width that potentially accommodates a portion of the vessel in a stable manner, i.e., when the vessel is placed in the slot, the vessel does not have a tendency to tip such that the interior surface of the vessel begins to face the base. The placement of the vessel in the defined slot is then attempted such that one of the pair of bendable members that define the slot engages the rim of the vessel and the other of the pair of bendable members that define the slot engages the exterior of the vessel.

If the cooking utensil has a tendency to tip such that the interior surface of the utensil begins to face the base, the slot is too narrow. In this case, the method further includes bending at least one of the pair of bendable members that define the slot. This can involve bending one of the bendable members so that the member is at an angle that brings the member closer to the base but still in a position to support the vessel. Alternatively, this can involve bending one of the bendable members such that the member is no longer in a position to support the vessel. In this case, the original pair of bendable members no longer define a slot for accommodating the vessel. If necessary, at least one of the plurality of bendable members is then bent so that a different pair of the plurality of bendable members define a wider slot than the original slot. In either case, the placement of the utensil in the wider slot is then attempted. Typically, the utensil will be accommodated in the wider slot in a stable manner such that no further adjustment is required. If this is not the case, the process of defining a wider slot can be repeated.

If the cooking utensil does not have a tendency to tip but the slot could be narrower and still accommodate the utensil in a stable manner, the slot may be considered to be too wide. In this case, the method further includes bending a least one of the plurality of bendable members that define the slot. This can involve bending one of the bendable members so that the member is at an angle that brings the member closer to the base but still in a position to support the vessel. Alternatively, this can involve bending one of the bendable members such that a different pair of bendable members define a new slot with a width that is less than the original slot. In either case, the placement of the utensil in the narrower slot is then attempted. If the utensil is accommodated in the narrower slot in a stable fashion and a yet narrower slot does not appear feasible, no further adjustment is needed. On the other hand, if the utensil is not accommodated in the narrower slot, further adjustment will be required to define a slot with a width that is greater than the narrower slot.

Yet another embodiment of the invention is directed to a storage rack that is comprised of a base, a plurality of members operatively attached to the base with at least two of the members defining a slot for accommodating a cooking utensil with an extended handle, and a bendable handle support. The bendable handle support is capable of being bent to a first position for supporting the extended handle of a cooking utensil so that the handle is supported above the surface on which the base is positioned and to a second position at which the extended handle of a cooking utensil is not supported above the surface on which the base is positioned.

Another embodiment of the invention is directed to a storage rack that is comprised of a base, a plurality of members operatively attached to the base with at least two of the members defining a slot for accommodating a cooking utensil with an extended handle, and a bendable positioner for use in fixing the position of the base within a cabinet or drawer, or on a shelf. The bendable positioner is capable of being bent so as to extend away from the base and to engage a surface, such as a wall of a cabinet, so as to facilitate the fixing of the base at a desired position. In one embodiment, multiple bendable positioners are provided.

In one embodiment, one of the bendable members comprises a wire that extends from a first end that is operatively attached to the base to a second end that is free. The wire can be bent about the attachment point as needed to define the slot into which a particular vessel is to be positioned. In another embodiment, the wire is folded at a point that is in between the first and second ends. Consequently, the wire can be unfolded to provide a longer support structure.

BRIEF DESCRIPTION OF THE DRAWINGS

FIGS. 1A-1C respectively are a first perspective view, second perspective view, and a cross-sectional view of a cooking utensil with a perpendicular side profile;

FIGS. 2A-2C respectively are a first perspective view, second perspective view, and a cross-sectional view of a cooking utensil having a difference between the radius of the rim and the radius of the bottom surface and a side profile that is angled;

FIGS. 3A-3C respectively are a first perspective view, second perspective view, and a cross-sectional view of a cooking utensil having a relatively large difference between the radius of the rim and the radius of the bottom surface, a relatively large height, and a side profile that is curved;

DETAILED DESCRIPTION

Figure 4:
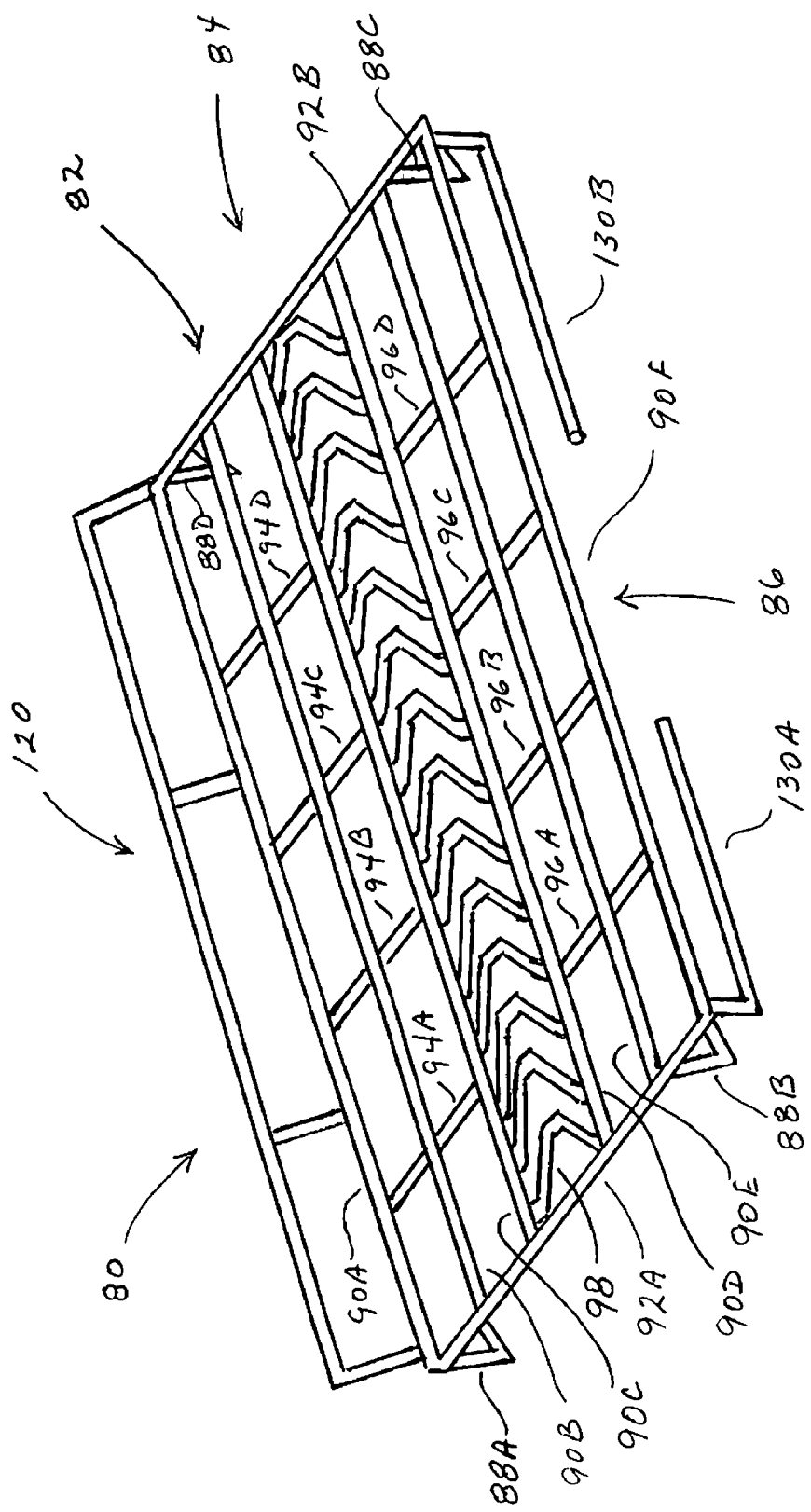
FIG. 4 illustrates an embodiment of adjustable storage rack for cooking utensils that includes a single array of bendable members that can be adjusted to support multiple cooking utensils having different height, side profile, and/or difference in radius characteristics in a horizontal stack.

An embodiment of a cooking utensil, hereinafter referred to as utensil 10, is illustrated in FIGS. 1A-1C. The utensil 10 includes a vessel 12 for holding food and an extended handle 14 that allows a cook to manipulate the vessel 12. The vessel 12 is comprised of an interior surface 16, an exterior surface 18, and a rim 20 extending between the interior surface 16 and exterior surface 18. The exterior surface 18 is comprised of a flat bottom surface 22 and a side surface 24 that extends between the flat bottom surface 22 and the rim 20. In utensil 10, the flat bottom surface 22 and the rim 20 have substantially the same radius. As a consequence, the side surface 24 has a side profile that is substantially perpendicular to the flat bottom surface 22 and has a substantially cylindrical shape. A portion of the interior surface 16, exterior surface 18, and rim 20 are shaped to form a spout 26. Nonetheless, in the plan view, the vessel 12 has a substantially circular outline. The vessel 12 also has a height 28 that is the perpendicular distance between a plane defined by the flat bottom surface 22 and a substantially parallel plane defined by the rim 20, exclusive of the spout 26.

Another embodiment of a cooking utensil, hereinafter referred to as utensil 32, is illustrated in FIGS. 2A-2C. The utensil 32 includes a vessel 34 and an extended handle 36. The vessel 34 includes an interior surface 38, an exterior surface 40, and a rim 42 that extends between the interior surface 38 and the exterior surface 40. The exterior surface 40 is comprised of a flat bottom surface 44 and a side surface 46 that extends between the flat bottom surface 44 and the rim 42. The flat bottom surface 44 has a smaller radius than the rim 42. As such, the utensil 32 illustrates one of the types of side profiles that occurs when there is a difference in the radiuses of the bottom surface 40 and the rim 38. The side profile is angled relative to the plane defined by the flat bottom surface 40, i.e., not perpendicular to the flat bottom surface. Alternatively, the side profile is characterized as the conic section that is presented between the base of a right circular cone and a plane that is perpendicular to the axis of the cone and intersects the cone between the apex and the base. The vessel 34 also has a height 48 that is the perpendicular distance between a plane defined by the flat bottom surface 44 and a substantially parallel plane defined by the rim 42.

Yet another embodiment of a cooking utensil, hereinafter referred to as utensil 50, is illustrated in FIGS. 3A-3C. The utensil 50 includes a vessel 52 and an extended handle 54. The vessel 52 includes an interior surface 56, an exterior surface 58, and a rim 60 that extends between the interior surface 56 and the exterior surface 58. The exterior surface 58 is comprised of a flat bottom surface 62 and a side surface 64 that extends between the flat bottom surface 62 and the rim 60. The flat bottom surface 62 has a smaller radius than the rim 60. Utensil 50 illustrates a third type of side profile, namely, a curved side profile. As shown in cross-sectional view, the side surface follows a curve between the flat bottom surface 62 and the rim 60. The vessel 52 has a height 66 that is the perpendicular distance between a plane defined by the flat bottom surface 62 and a substantially parallel plane define by the rim 60. The utensil 50 also has a second handle 68 disposed opposite to the extended handle 54.

FIG. 4 illustrates an embodiment of a storage rack that is capable of being adjusted to accommodate cooking utensils having different dimensional characteristics, hereinafter referred to as rack 80. The rack 80 is comprised of a base 82 and an array of bendable members 84 that is operatively attached to the base 82. The base 82 is comprised of a planar wire frame 86 and four wire legs 88A-88D that are for engaging a substantially horizontal support surface and elevating the frame 86 above the horizontal surface. The wire used in the frame 86 is the kind of wire that is commonly used in dish drainers and the like. Further, the wire can be coated or non-coated. The methods for manufacturing such frames are well known in the art. The frame 86 is comprised of longitudinal wire members 90A-90F, end wire member 92A, 92B, a first set of lateral wire member 94A-94D, and a second set of lateral wire members 96A-96D. One end of each of the longitudinal wire members 90A-90F is connected to end wire member 92A and the other end of each of the longitudinal wire members 90A-90F is connect to the end wire member 92B. One of each of the lateral wire members 94A-94D is connected to the longitudinal wire member 90A, the other end of each of the lateral wire members 94A-94D is connected to the longitudinal wire member 90C, and a point in between the ends of each of the lateral wire members 94A-94D is connected to longitudinal wire member 90B. One of each of the lateral wire members 96A-96D is connected to the longitudinal wire member 90F, the other end of each of the lateral wire members 96A-96D is connected to the longitudinal wire member 90D, and a point in between the ends of each of the lateral wire members 96A-96D is connected to longitudinal wire member 90E.

The array of bendable members 84 is comprised of a plurality of substantially identical bendable member 98. Each of the bendable member 98 have a U-type shape with one end attached to the longitudinal wire member 90C and the other end attached to the longitudinal wire member 90D. Each of the bendable member 98 is capable of being bent so as to rotate about an axis that extends between the two points at which the member 98 attaches to the longitudinal members 90C and 90D. In the illustrated embodiment, each of the member 98 is in non-supportive position.

Figure 5:
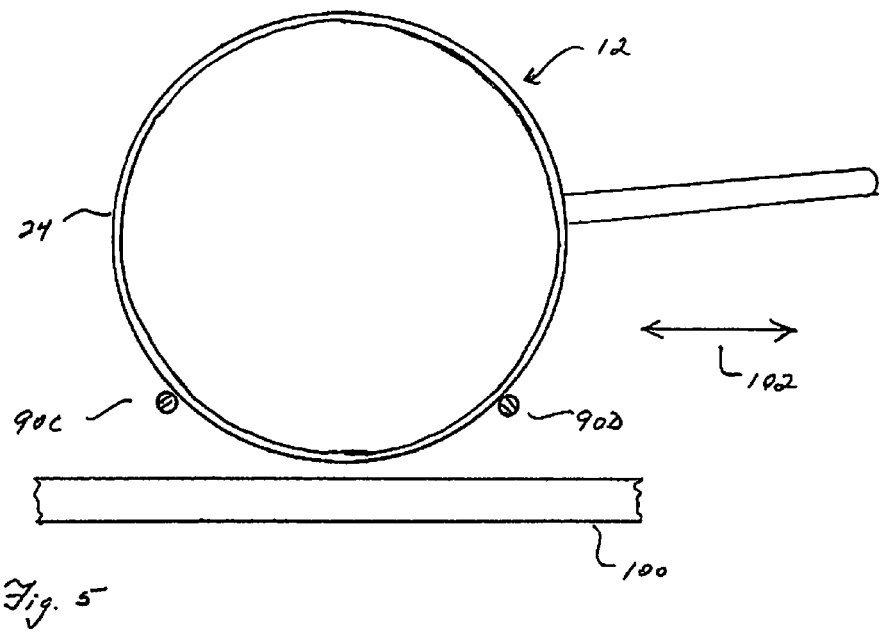
FIG. 5 illustrates the use of a pair of the longitudinal wires of the wire frame shown in FIG. 4 to position a cooking utensil so that two bendable members can support the cooking utensil.

The base 82, in addition to supporting the array 84, also provides a structure for positioning a cooking utensil so that two of the support member 98 can engage the utensil, one member 98 engaging the rim of the vessel and the other engaging the exterior surface of the vessel. To elaborate and with reference to FIG. 5, the base 82 functions to position the longitudinal wire members 90C and 90D above a support surface 100 so that the wire members 90C, 90D can each engage the side surface of a vessel of a cooking utensil (e.g., the side surface 24 of vessel 12) and there is sufficient space between the wire members 90C, 90D and the support surface 100 so that the vessel does not engage the support surface 100. As such, the wire members 90C, 90D serve to cradle the vessel so as to prevent the utensil from being displaced forward or backward, as represented by arrow 102. Further, since the array of bendable members 84 is disposed between the wire members 90C, 90D, the wire members 90C, 90D also serve to position a utensil so that two of the support member 98 can support the utensil such that the rim and flat bottom surface of the utensil are substantially perpendicular to the support surface 100. The spacing between the wire members 90C, 90D and the distance that the wire members 90C, 90D are supported above the support surface 100 are typically chosen to accommodate utensils having vessel diameters between about 175 mm and about 350 mm. If the rack 80 is to be disposed in a cabinet or drawer with a height constraint and relatively large diameter utensils are going to be accommodated in the rack, the distance that the wire members 90C, 90D are supported above the support surface is reduced relative to applications in which there is no or a reduced overhead constraint (e.g., a shelf or counter top). While the wire members 90C, 90D are shown as lying in a plane that, when the rack is in use, will be substantially parallel to a support surface, it should be appreciated that numerous other orientations of the wire members are feasible that would position a utensil for support by bendable members. Further, it should also be appreciated that material other than wire can be used to realize the position function provided by longitudinal wires 90C, 90D. For example, a pair of rails made from wood or a polymer that are attached to or integral with an underlying wood or polymer base can be utilized as a base. As such, a base that is made from a material other than wire is feasible. A base made from a combination of materials (e.g., wood and wire) is also feasible.

Figures 6A, 6B:
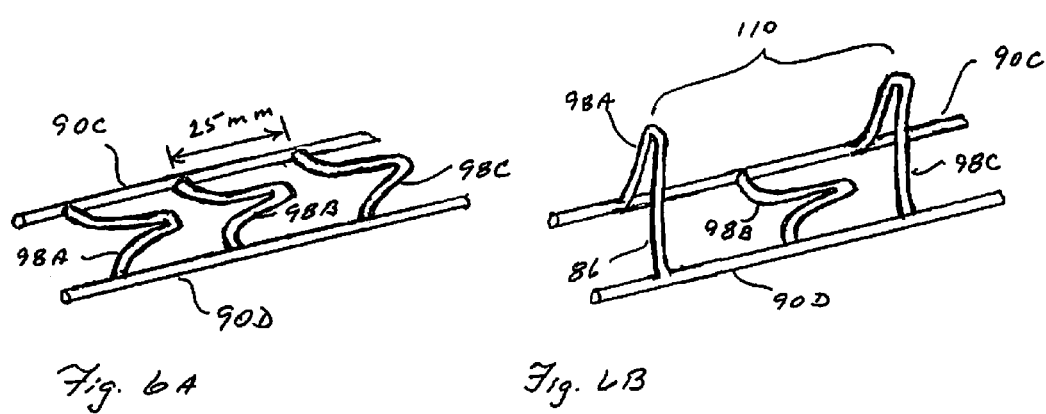
FIGS. 6A-6C respectively illustrate the array of bendable members in an initial state in which all the members are in a non-supportive position, in a subsequent state in which two of the members have been bent to a supportive position that defines a slot for potentially accommodating a vessel of a cooking utensil, and the members that are in the supportive position supporting a vessel in a stable fashion.
Figure 6C:
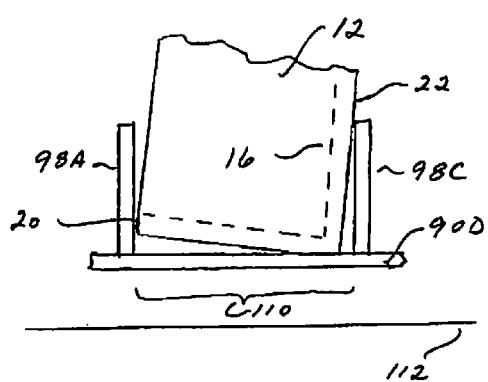

With reference to FIGS. 6A-6C, an example of the method of adjusting the rack 80 to accommodate a utensil when the bendable members 98A-98C in a portion of the array 84 that is to subsequently support the utensil are each in a non-supportive position. FIG. 6A illustrates each of the bendable members 98A-98C in the portion of the array 98 that is to accommodate a utensil in the non-supportive position. For this example, consecutive attachment points of each of the bendable members 98A-98C to the longitudinal wire members 90C, 90D are separated from one another by about 25 mm, each of the bendable members 98A-98C will extend about 50 mm above the longitudinal wire members 90C, 90D when bent so as to be perpendicular to the plane defined by the wire members 90C, 90D, and the utensil is of the type shown in FIGS. 1A-1C and has a height of about 45 mm. To adjust the rack to accommodate the utensil, an assessment is made of the characteristics of the utensil relative to the bendable members 98A-98C. In this case, the rim 20 and the flat bottom surface 22 have substantially the same radius. Consequently, when the vessel 12 is supported by the rack such that the plane of the rim 20 is substantially perpendicular to whatever support surface the base 82 is disposed upon, one of the bendable members 98A-98C will engage the rim 20 and another of the bendable members 98A-98C will engage the flat bottom surface 22 of the vessel 12. As such, the controlling factor in determining which of the bendable members 98A-98C to place in a supportive position is the height of the vessel 12. Since the vessel 12 has a height that is greater than the distance between the attachment points of consecutive bendable members 98A-98C to the longitudinal members 90C, 90D and less than the distance between the attachment points of the bendable members 98A and 98C to the longitudinal members 90C, 90D, the first and third bendable members 98A, 98C are chosen to be bent or placed in a supportive position, as shown in FIG. 6B. Once bent, the first and third bendable members 98A, 98C define a slot 110 with a width that potentially accommodates the vessel 12. While the user can measure the distance between the bendable members and the height of a vessel to determine which bendable members in a group of bendable members need to be in a support position and which need to be in a non-support position, such measurements are typically not necessary. The user can place a bendable member 98 in a support position and then position the vessel such that the rim or flat bottom engages the support member and the vessel is positioned so that the plane of the rim is substantially perpendicular to the support surface. The user can then determine which of the remaining support members in the non-support position should be placed in the support position to maintain the vessel such that the rim is substantially perpendicular to the support surface. Alternatively, the user can place the vessel on the rack such that the plane defined by the rim 20 is substantially perpendicular to the support surface and identify the two support members needed to define a slot for potentially accommodating the vessel 12.

Once the two members 98A, 98C have been placed in the supportive position, the user attempts to place the vessel 12 in the slot 110 defined by the two members 98A, 98C. As shown in FIG. 6C, the slot 110 accommodates the vessel 12 and supports the vessel 12 such that the plane defined by the rim 20 of the vessel is substantially perpendicular to the support surface 112. Further, the vessel 12 is supported such that the vessel 12 is stable, i.e., does not have a tendency to tip such that the interior 16 begins to face towards the support surface 112. If the slot 110 did not accommodate the vessel 12 in a stable manner, i.e., was too narrow, a different pair of bendable members could be used to define a wider slot that is capable of accommodating the vessel 12. If, on the other hand, the slot 110 accommodated the vessel 12 in a stable position, but the vessel 12 could be accommodated in a stable manner such that the plane defined by the rim 20 was closer to being perpendicular to the support surface 112, the slot 110 might be considered to be too wide and potentially reduce the number of utensils that could be stored using the rack. In this case, a different pair of bendable members could be used to define a narrower slot that is capable of accommodating the vessel 12.

Figure 7A:
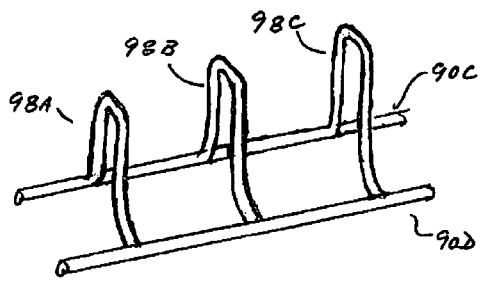
FIGS. 7A-7E respectively illustrate the array of bendable members in an initial state in which all the bendable members are in a supportive position, a subsequent state in which the bendable member between two bendable members that define a slot for potentially accommodating a cooking utensil has been bent to a non-supportive position, the members that are in the supportive position supporting a vessel in a stable fashion, and the adjustment of one of the members in the supportive position to support the vessel at a steeper angle, and the adjustment of one of the intermediate members to support the vessel at a yet steeper angle.
Figure 7B:
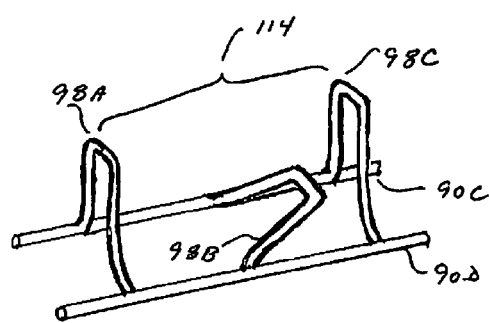
Figure 7C:
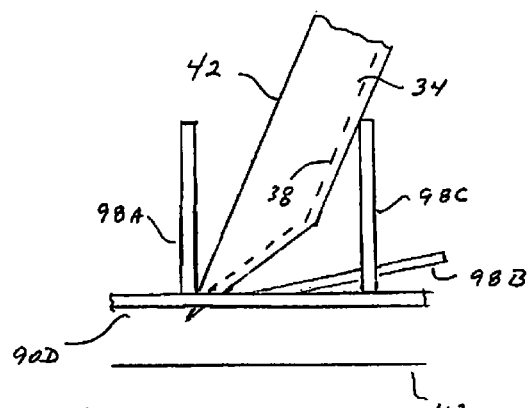
Figure 7D:
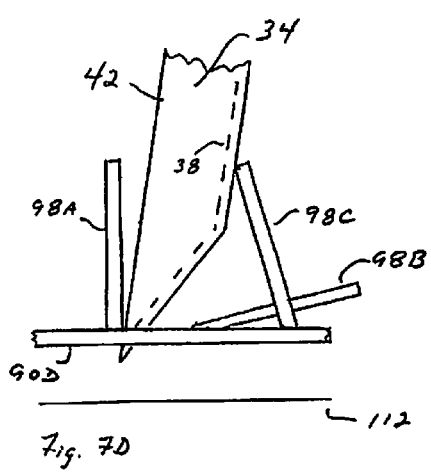
Figure 7E:
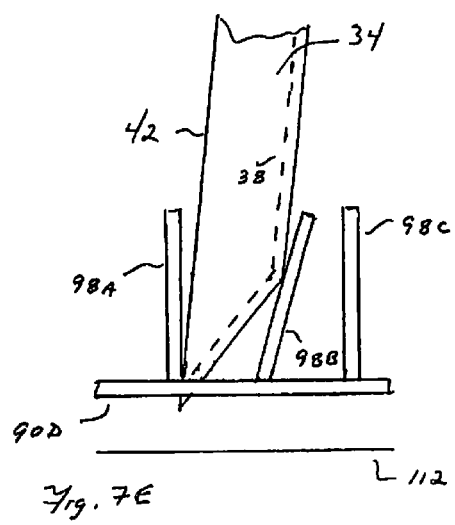

With reference to FIG. 7A-7E, an example of the method of adjusting the rack 80 to accommodate a utensil when the bendable members 98A-98C in a portion of the array 84 that is to subsequently support the utensil are each in a supportive position. FIG. 7A illustrates each of the bendable members 98A-98C in the portion of the array 98 that is to accommodate a utensil in the supportive position. For this example, consecutive attachment points of each of the bendable members 98A-98C to the longitudinal wire members 90C, 90D are separated from one another by about 25 mm, each of the bendable members 98A-98C will extend about 50 mm above the longitudinal wire members 90C, 90D when bent so as to be perpendicular to the plane defined by the wire members 90C, 90D, and the utensil is of the type shown in FIGS. 2A-2C, has a height of about 30 mm, has a difference in radius of about 35 mm, and an angled side profile. To adjust the rack to accommodate the utensil, an assessment is made of the utensil relative to the bendable members 98A-98C. In this case, the height of the vessel is greater than the distance between the attachment points of consecutive bendable members 98A-98C and less than the distance between the attachment points of the bendable members 98A and 98C to the longitudinal members 90C, 90D. Consequently, as shown in FIG. 7B, the second member 98B can be bent to a non-supportive position to define a slot 114 between the first and third members 98A and 98C that potentially accommodates the vessel 34. As shown in FIG. 7C, when the vessel 34 is accommodated by the slot 114 in a stable position, the plane defined by the rim 42 of the vessel is substantially perpendicular to the support surface 112. However, the vessel 34 is supported at an angle such that the vessel consumes a significant amount of horizontal space, which potentially reduces the number of utensils that can be accommodated by the rack. If the slot can be redefined such that the vessel 34 is supported at an angle that is closer to being perpendicular to the support surface 112, it may be possible to accommodate more utensils in the rack. As shown in FIG. 7D, the bendable member 98C can be adjusted so that the vessel 34 is supported such that the plane defined by the rim 42 is closer to being perpendicular to the support surface 112. Alternatively, as shown in FIG. 7E, the bendable members 98B can be used in conjunction with bendable member 98A to support the vessel 34 such that the plane defined by the rim 42 is at an angle that is closer to being perpendicular to the support surface 112. In this case, the bendable support engages the exterior surface 40 at the location at which the exterior surface 40 transitions between the flat bottom surface 44 and the side surface 46. It should be appreciated that the user of the rack may initially define the slot for supporting the vessel 34 using bendable members 98A and 98B rather than bendable members 98A and 98C.

Figure 8A:
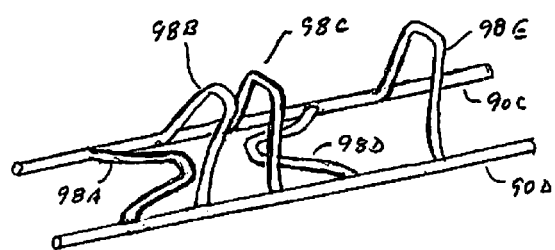
FIGS. 8A-8E respectively illustrate the array of bendable members in an initial state in which some of the members are in a supportive position and some of the members are in a non-supportive position, a subsequent state in which two bendable members define a slot for accommodating a cooking utensil in a manner that occupies significant horizontal space in the rack, a subsequent state in which two bendable members define a slot for accommodating the cooking utensil in an unstable manner, a subsequent state in which two bendable members define a slot for accommodating the cooking utensil in a stable manner that occupies less horizontal space in the rack, and a subsequent state in which two bendable members define a slot for accommodating the cooking utensil in a stable manner that occupies less horizontal space in the rack.
Figure 8B:
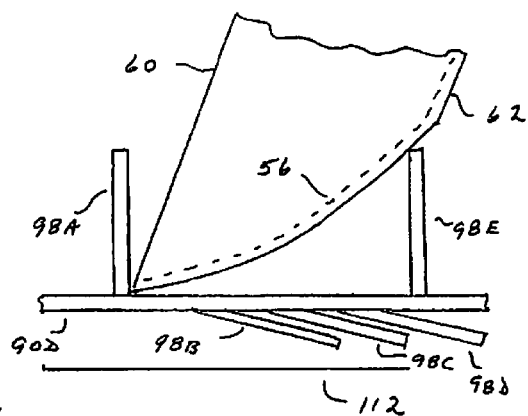

With reference to FIG. 8A-8E, an example of the method of adjusting the rack 80 to accommodate a utensil when bendable members 98A-98E in a portion of the array 84 that is to subsequently support the utensil are each in either a supportive position or a non-supportive position. FIG. 8A illustrates each of the bendable members 98A-98E in the portion of the array 98 that is to accommodate a utensil in one of a supportive position or a non-supportive position. For this example, consecutive attachment points of each of the bendable members 98A-98E to the longitudinal wire members 90C, 90D are separated from one another by about 25 mm, each of the bendable members 98A-98E will extend about 50 mm above the longitudinal wire members 90C, 90D when bent so as to be perpendicular to the plane defined by the wire members 90C, 90D, and the utensil is of the type shown in FIGS. 3A-3C, has a height of about 80 mm, has a difference in radius of about 100 mm, and has a curved side profile. To adjust the rack to accommodate the utensil, an assessment is made of the characteristics of the utensil relative to the bendable members 98A-98E. In this case, the height of the vessel 52 (80 mm) is slightly less than the distance between the attachment points of the bendable members 98A and 98E. However, the difference in radius of the vessel 52 (100 mm) is greater than the maximum distance that the bendable members 98A-98D can extend above the longitudinal wire members 90C, 90D. Consequently, if bendable members 98A and 98E are chosen to define a slot that potentially accommodates the vessel 52, one of the bendable members 98A and 98E (if positioned to be perpendicular to the longitudinal wire members 90C, 90D) will engage the curved side surface 64 of the vessel 52 at a point that is close to the flat bottom surface 62. See FIG. 8B. While the vessel 52 is supported by the bendable members 98A and 98E in a stable manner, the cooking utensil occupies a considerable amount of horizontal space in the rack and is likely to limit the number of cooking utensils that can be accommodated by the rack. While the user may initially use bendable members 98A and 98E to define a slot for accommodating the vessel 52, the large difference in radius of the vessel 52 relative to the maximum height that the bendable members 98A-98D are capable of attaining relative to the longitudinal wire members 90C, 90D suggests that using two of the bendable members 98A-98E that are separated from one another by at least one bendable member or are adjacent to one another is likely to result in the defining of a slot that will accommodate the vessel 52 and is capable of supporting the vessel 52 in a position such that the plane defined by the rim 60 is closer to being perpendicular relative to support surface 112 than shown in FIG. 8B.

Figure 8C:
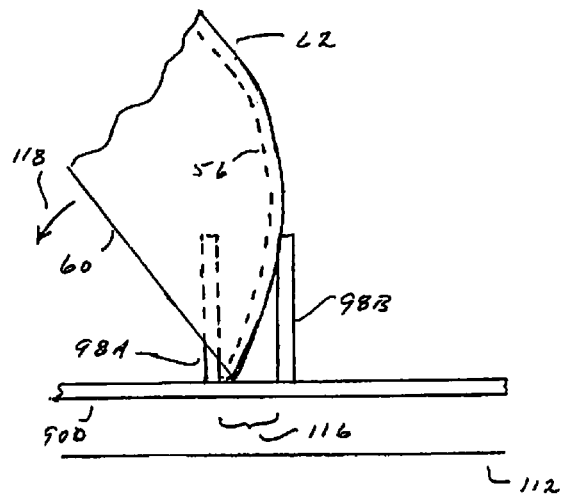
Figure 8D:
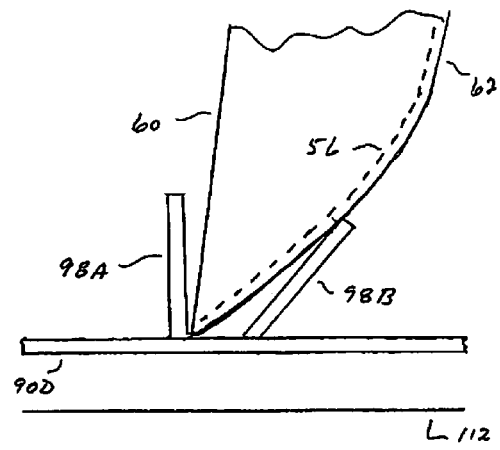
Figure 8E:
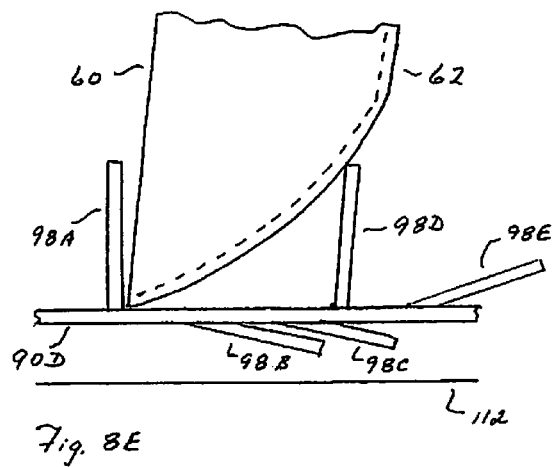

With reference to FIG. 8C, if the bendable members 98A, 98B are chosen to define a slot 116 for accommodating the vessel 52, the cooking utensil 50 is not supported in a stable fashion. More specifically, cooking utensil 50 tips, as shown by arrow 118, such that the interior surface 56 of the vessel 52 begins to face the supporting surface 112 and the rim 60 of the vessel either falls out of contact with the bendable member 98A or never comes into contact with the bendable member 98A. As such, the slot 116 is too narrow. With reference to FIG. 8D, one approach to defining a new slot that will both accommodate the vessel 52 and support the cooking utensil 50 in a stable position is to bend the bendable member 98B so as to rotate away from bendable member 98A. Alternatively and with reference to FIG. 8E, two of the bendable members 98A-98D that are separated from one another by at least one of the other bendable members 98A-98D can be used to define a new slot that is potentially capable of accommodating the vessel 52 in a stable manner. In this case, bendable members 98A, 98D are used to define a new slot. As shown in FIG. 8E, the vessel 52 is supported in the new slot such that the plane defined by the rim 60 of the vessel is substantially perpendicular to the support surface 112. If having the plane even closer to being perpendicular is desired, the bendable member 98C can be bent so as to rotate towards the bendable member 98A.

Figure 9:
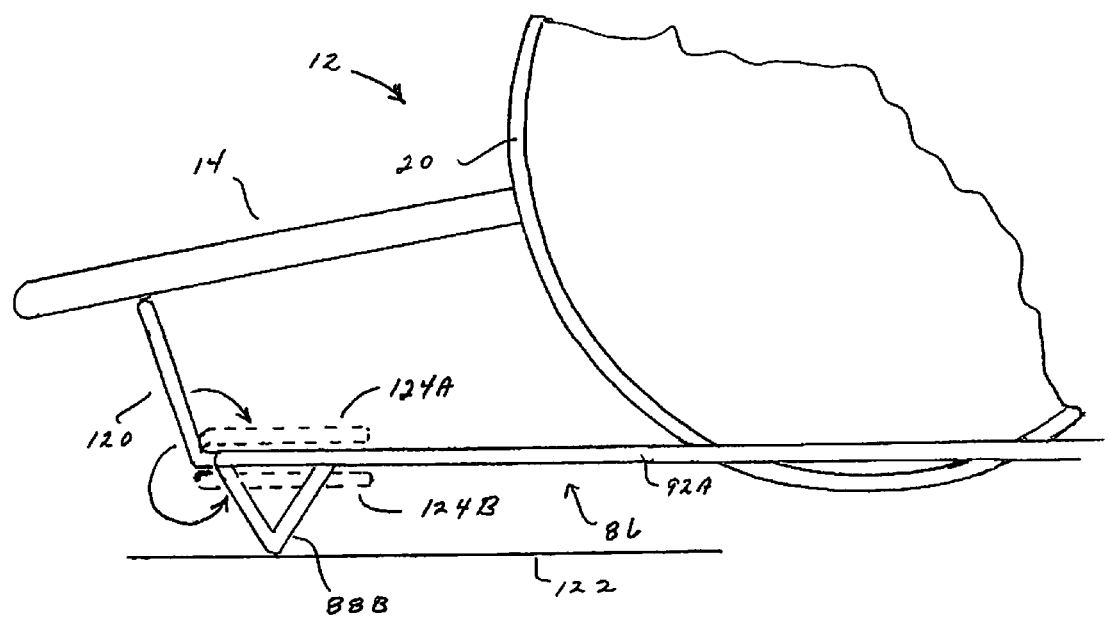
FIG. 9 illustrates a bendable handle support for supporting an extended handle of a cooking utensil located in a slot defined by the rack at a desired position relative to the wire frame of the rack.

With reference to FIG. 4, the rack 80 further includes a bendable handle support 120 that is capable of being bent into a position to support an extended handle of a cooking utensil above a supporting surface 122 on which the rack is positioned and into a position at which an extended handle of a cooking utensil is not supported above a supporting surface. With reference to FIG. 9, the bendable handle support 120 can be bent to a position in a range extending from a position 124A adjacent to the top side of the wire frame 86 to a position 124B adjacent to the bottom side of the wire frame 86. It should be appreciated that smaller ranges are also feasible, provided the handle support is capable of being positioned to engage an extended handle of a cooking utensil so that the handle is spaced from the supporting surface 122 and to not engage an extended handle of a cooking utensil so that the handle is spaced from the supporting surface 122. In FIG. 8, the bendable handle support 120 has been bent so as to be positioned to support the extended handle 14 of the cooking utensil 12 so that the handle is spaced from the support surface 122. While the bendable handle support 120 is associated with one side of the rack 80, a second bendable handle support can be associated with the opposite side of the rack 84 if needed or desired. Further, it should be appreciated that the bendable handle support 120 can be replaced with a multiple handle supports that would each allow individual extended handles or a group of extended handles to be positioned as needed or desired by the user.

Figure 10:
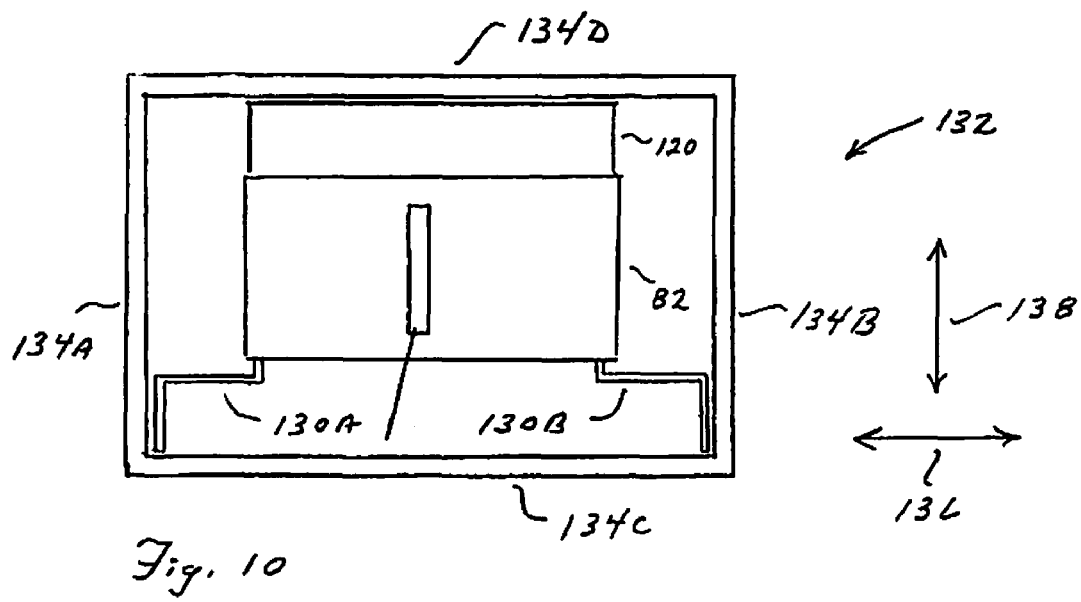
FIG. 10 is a plan view of the rack located in a drawer and with two bendable positioning members bent so as to limit movement of the base of the rack within the drawer.

With continuing reference to FIG. 4, the rack 84 further includes a pair of bendable positioning members 130A, 130B for facilitating the fixing of the position of the base 82 within a cabinet or drawer, or on a shelf or counter top, or on a similar support surface by engaging an upwardly extending surface, typically, a wall of some kind. FIG. 10 illustrates an example of the use of the bendable positioning members 130A, 130B to fix the position of the base 82 within a drawer 132. The bendable positioning members 130A, 130B have been bent so as to engage the sides 134A, 134B of the drawer 132 so as to prevent the base 82 from moving side-to-side in the drawer 132, i.e., in the directions of arrow 136, which might otherwise occur during opening and closing of the drawer 132 or during insertion or removal of cooking utensils from the rack 80. In addition, the bendable positioning members 130A, 130B have been bent so as to engage the front side 134C of the drawer 132. In this case, the bendable handle support 120 has also been employed as a bendable positioning member to engage the back side 134D of the drawer 132. The bendable positioning members 130A, 130B and the bendable handle support 120 cooperate to prevent the base 82 from moving back-and-forth in the drawer 132, i.e., in the directions of arrow 138, which also might otherwise occur during opening and closing of the drawer 132 or during insertion or removal of cooking utensils from the rack 84. It should be appreciated that a rack can include one or more bendable positioning members and any such positioning members can be used to facilitate the fixing of a rack to some extent within a cabinet or drawer, or on a shelf or counter top, or on a similar surface provided that is an adjacent surface that the bendable positioning member can be positioned to engage in light of the position at which the user wants to place the base of the rack. As an alternative to the use of a bendable positioning member, one or more flanges associated with the base and that each have a hole or slot for accommodating a screw, nail, or other similar fastener that can be used to fix the position of the base within a cabinet or drawer, or on a shelf or counter top, or on a similar support surface.

Figure 11:
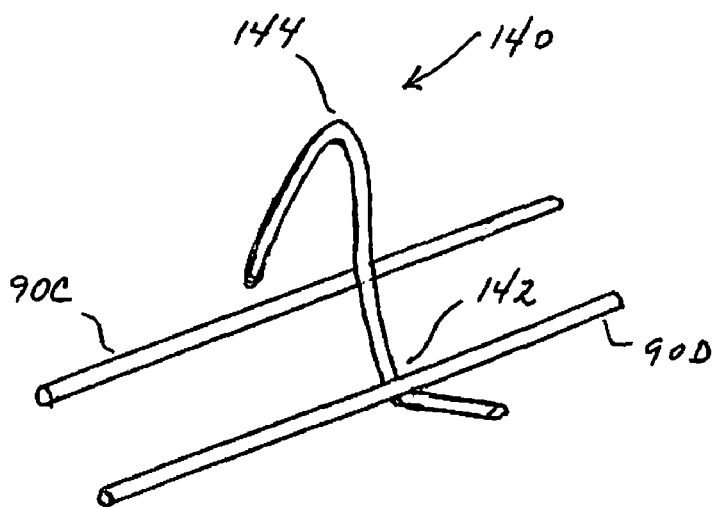
FIG. 11 illustrates an alternative bendable member that is operatively attached to the base at one end.

FIG. 11 illustrates an alternative bendable member 140 that can be associated with a base, such as base 82. The bendable member 140 is illustrated as being associated with base 82. However, it should be appreciated that other bases are feasible and the bendable member 140 is capable of being adapted to such other bases. The bendable member 140 is attached to the longitudinal member 90D at location 142. As such, the bendable member 140 can be bent so as to rotate about any one or a combination of three orthogonal axes. Further, the bendable member 140 can be bent about point 144 to extend the reach of the bendable member 140, which is or may be desirable when attempting to adjust the rack to accommodate cooking utensils of large diameter and/or cooking utensils with a large difference of radius, such as stir fry pans and woks.

The foregoing description of the invention is intended to explain the best mode known of practicing the invention and to enable others skilled in the art to utilize the invention in various embodiments and with the various modifications required by their particular applications or uses of the invention.

What is claimed is:

1. A method that allows a user of a storage rack for cooking utensils to adjust the storage rack to accommodate a particular cooking utensil comprising:
    providing a storage rack having a base with a lower surface for engaging a support surface and a plurality of bendable members operatively attached to said base, each of the plurality of bendable members being bendable by a user of the rack using their own strength or their own strength supplemented with a simple or typical household tool;
    providing a cooking utensil having a vessel for holding food and an extended handle operatively attached to said vessel, said vessel having an exterior surface with a substantially flat bottom surface, an interior surface, and a rim extending between said exterior surface and said interior surface, said vessel having a substantially circular shape in plan view;
    assessing at least one characteristic of said vessel relative to said plurality of bendable members;
    first bending, based on said assessing, at least one of said plurality of bendable members such that a pair of said plurality of bendable members define a slot with a width that potentially accommodates a portion of said vessel;
    attempting, following said bending, to place said vessel in said slot such that one of said pair of said plurality of bendable members that defines said slot engages said rim of said vessel, the other of said pair of said plurality of bendable members that defines said slot engages said exterior surface of said vessel, and the cooking utensil does not tip such that said interior surface begins to face said base.

2. A method, as claimed in claim 1, further comprising:
    second bending, if said slot does not accommodate said vessel without said cooking utensil having a tendency to tip, at least one of said pair of said plurality of bendable members.

3. A method, as claimed in claim 2, further comprising:
    third bending at least one of said plurality of bendable member so that a different pair of said plurality of bendable members define a new slot with a new width that is greater than said width of said slot.

4. A method, as claimed in claim 1, further comprising:
    bending, if said slot does accommodate said vessel without said cooking utensil having a tendency to tip but a narrower slot may also accommodate said cooking utensil such that said cooking utensil does not have a tendency to tip, at least one of said plurality of bendable members.

5. A method, as claimed in claim 1, wherein said step of providing a storage rack comprises:
    providing a storage rack with a bendable handle support that is operatively attached to said base and capable of being bent to a first position for supporting said extended handle of said cooking utensil above said support surface and a second position for not supporting said extended handle above said support surface.

6. A method, as claimed in claim 5, further comprising:
    bending said bendable handle support so as to place said bendable handle support in one of said first position and said second position.

7. A method, as claimed in claim 1, wherein said step of providing a storage rack comprises:
    providing a storage rack with a bendable positioner that is operatively attached to said base and capable of being bent to engage a vertical surface adjacent to the support surface.

8. An adjustable storage rack for cooking utensils comprising:
    a base having a lower surface for positioning adjacent to a support surface;
    a plurality of members operatively attached to said base, at least two of said plurality of members capable of defining a slot for accommodating a cooking utensil having a vessel for holding food, at least one extended handle operatively attached to said vessel, an exterior surface with a substantially flat bottom surface, an interior surface, and a substantially circular rim extending between said exterior surface and said interior surface; and
    a bendable handle support capable of being bent to any one of a plurality of first position for supporting an extended handle of a cooking utensil at a desired one of a plurality of distances from a support surface and a second position for not supporting an extended handle spaced from a support surface, the bendable handle support being bendable by a user of the rack using their own strength or their own strength supplemented with a simple or typical household tool.

9. An adjustable storage rack, as claimed in claim 8, wherein:
    said plurality of members comprises at least two bendable members that can each be bent from a first position to a second position to define a slot for accommodating a cooking utensil.

10. An adjustable storage rack, as claimed in claim 8, further comprising:
    a bendable positioner operatively attached to said base and capable of being bent so as to engage a surface adjacent to a support surface.

11. An adjustable storage rack for cooking utensils comprising:
    a base having a lower surface for positioning adjacent to a support surface, the base having a fixed periphery;
    a plurality of members operatively attached to said base, at least two of said plurality of members capable of defining a slot for accommodating a cooking utensil having a vessel for holding food, at least one extended handle operatively attached to said vessel, an exterior surface with a substantially flat bottom surface, an interior surface, and a substantially circular rim extending between said exterior surface and said interior surface; and
    a bendable positioner operatively attached to said base and capable of being bent so as to extend beyond the fixed periphery of the base and engage a surface adjacent to and other than a support surface, the bendable positioner being bendable by a user of the rack using their own strength or their own strength supplemented with a simple or typical household tool.

12. An adjustable storage rack, as claimed in claim 11, wherein:
    said plurality of members comprises at least two bendable members that can each be bent from a first position to a second position to define a slot for accommodating a cooking utensil.

13. An adjustable storage rack, as claimed in claim 11, further comprising:

a bendable handle support capable of being bent to a first position for supporting an extended handle of a cooking utensil spaced from a support surface and a second position for not supporting an extended handle spaced from a support surface.

14. An adjustable storage rack for cooking utensils comprising:

a base having a lower surface for positioning adjacent to a support surface, the base having a fixed periphery;

a plurality of bendable members operatively attached to said base, at least two of said plurality of bendable members capable of defining a slot for accommodating a cooking utensil having a vessel for holding food, at least one extended handle operatively attached to said vessel, an exterior surface with a substantially flat bottom surface, an interior surface, and a substantially circular rim extending between said exterior surface and said interior surface;

wherein at least one of said plurality of bendable members comprises a wire having a first terminal end, a second terminal end, and an intermediate section extending between said first and second terminal ends, said first terminal end being operatively attached to said base at a first attachment point that is located within the periphery of the base and said second terminal end being unattached;

said at least one of said plurality of bendable members being bendable so that said intermediate section and said second terminal end rotate about said first attachment point and being bendable by a user of the rack using their own strength or their own strength supplemented with a simple or typical household tool.

15. An adjustable storage rack, as claimed in claim 14, further comprising:

a bendable handle support capable of being bent to a first position for supporting an extended handle of a cooking utensil spaced from a support surface and a second position for not supporting an extended handle spaced from a support surface.

16. An adjustable storage rack, as claimed in claim 14, further comprising:

a bendable positioner operatively attached to said base and capable of being bent so as to engage a surface adjacent to a support surface.

17. An adjustable storage rack, as claimed in claim 14, wherein:

said plurality of members comprises at least two bendable members that can each be bent from a first position to a second position to define a slot for accommodating a cooking utensil.

\* \* \* \* \*